(12) United States Patent
Sato et al.

(10) Patent No.: US 11,985,034 B2
(45) Date of Patent: May 14, 2024

(54) SYSTEM AND METHOD FOR SELECTING COMPUTING DEVICE FOR MULTI-USER ACCESS

(71) Applicant: Nippon Telegraph and Telephone Corporation, Tokyo (JP)

(72) Inventors: Takuya Sato, Musashino (JP); Tomohiro Okada, Musashino (JP); Takayuki Nakamura, Musashino (JP); Shunsuke Homma, Musashino (JP); Mitsuo Amasaka, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/802,304

(22) PCT Filed: Feb. 27, 2020

(86) PCT No.: PCT/JP2020/008167
§ 371 (c)(1),
(2) Date: Aug. 25, 2022

(87) PCT Pub. No.: WO2021/171521
PCT Pub. Date: Sep. 2, 2021

(65) Prior Publication Data
US 2023/0086095 A1    Mar. 23, 2023

(51) Int. Cl.
*H04L 41/0893*    (2022.01)
*H04L 43/0852*    (2022.01)

(52) U.S. Cl.
CPC ...... *H04L 41/0893* (2013.01); *H04L 43/0852* (2013.01)

(58) Field of Classification Search
CPC .................. H04L 41/0893; H04L 43/0852
See application file for complete search history.

(56) References Cited

U.S. PATENT DOCUMENTS

| | | | |
|---|---|---|---|
| 9,723,535 B1* | 8/2017 | Marupaduga | H04W 36/14 |
| 2020/0169856 A1* | 5/2020 | Yang | H04L 67/1008 |
| 2021/0127241 A1* | 4/2021 | Moubayed | G06F 9/5066 |
| 2022/0006857 A1* | 1/2022 | Sun | H04L 67/1031 |

FOREIGN PATENT DOCUMENTS

JP    2019041266    3/2019

* cited by examiner

*Primary Examiner* — Viet D Vu
(74) *Attorney, Agent, or Firm* — Fish & Richardson P.C.

(57) ABSTRACT

A management device comprises an extracting means that extracts, from a database storing configuration information, the client terminals belonging to a specified group, network devices directly serving the client terminals, network devices between the serving network devices, and MEC devices to be treated as candidates for selection, and a selecting means that selects the MEC device to be accessed by the plurality of client terminals forming the group by using first and second amounts of latency, the first amount of latency being the amount of latency between each network device directly serving the client terminals belonging to the group and each MEC device, and the second amount of latency being the amount of latency between each network device directly serving the client terminals belonging to the group and each client terminal.

9 Claims, 15 Drawing Sheets

Fig. 7

|      | N2 | N4 | N8 | N11 |
|------|----|----|----|-----|
| MEC1 | 0  | 3  | 6  | 8   |
| MEC2 | 3  | 0  | 5  | 7   |
| MEC3 | 6  | 5  | 0  | 4   |
| MEC4 | 7  | 6  | 3  | 1   |

| | C1 | C2 | C3 |
|---|---|---|---|
| N2 | 2 | 1 | 1 |

(b)

| | C4 | C5 |
|---|---|---|
| N4 | 1 | 2 |

(c)

| | C6 |
|---|---|
| N8 | 1 |

(d)

| | C7 |
|---|---|
| N11 | 2 |

|  | C1 | C2 | C3 |
|---|---|---|---|
| N2 | 2 | 1 | 1 |

(b)

|  | C4 | C5 |
|---|---|---|
| N4 | 1 | 2 |

(c)

|  | C6 |
|---|---|
| N8 | 1 |

(d)

|  | C7 |
|---|---|
| N11 | 2 |

Fig. 10

|      | C1 | C5 | C6 | C7 |
|------|----|----|----|----|
| MEC1 | 2  | 5  | 7  | 10 |
| MEC2 | 5  | 2  | 6  | 9  |
| MEC3 | 8  | 7  | 1  | 6  |
| MEC4 | 9  | 8  | 4  | 3  |

|      | C1 | C5 | C6 | C7 |
|------|----|----|----|----|
| MEC1 | 2  | 5  | 7  | 10 |
| MEC2 | 5  | 2  | 6  | 9  |
| MEC3 | 8  | 7  | 1  | 6  |
| MEC4 | 9  | 8  | 4  | 3  |

(b)

|      | MAXIMUM VALUE |
|------|---------------|
| MEC1 | 10 |
| MEC2 | 9  |
| MEC3 | 8  |
| MEC4 | 9  |

Fig. 12

|      | C1 | C2 | C3 | C4 | C5 | C6 | C7 |
|------|----|----|----|----|----|----|----|
| MEC1 | 2  | 1  | 1  | 4  | 5  | 7  | 10 |
| MEC2 | 5  | 4  | 4  | 1  | 2  | 6  | 9  |
| MEC3 | 8  | 7  | 7  | 6  | 7  | 1  | 6  |
| MEC4 | 9  | 8  | 8  | 7  | 8  | 4  | 3  |

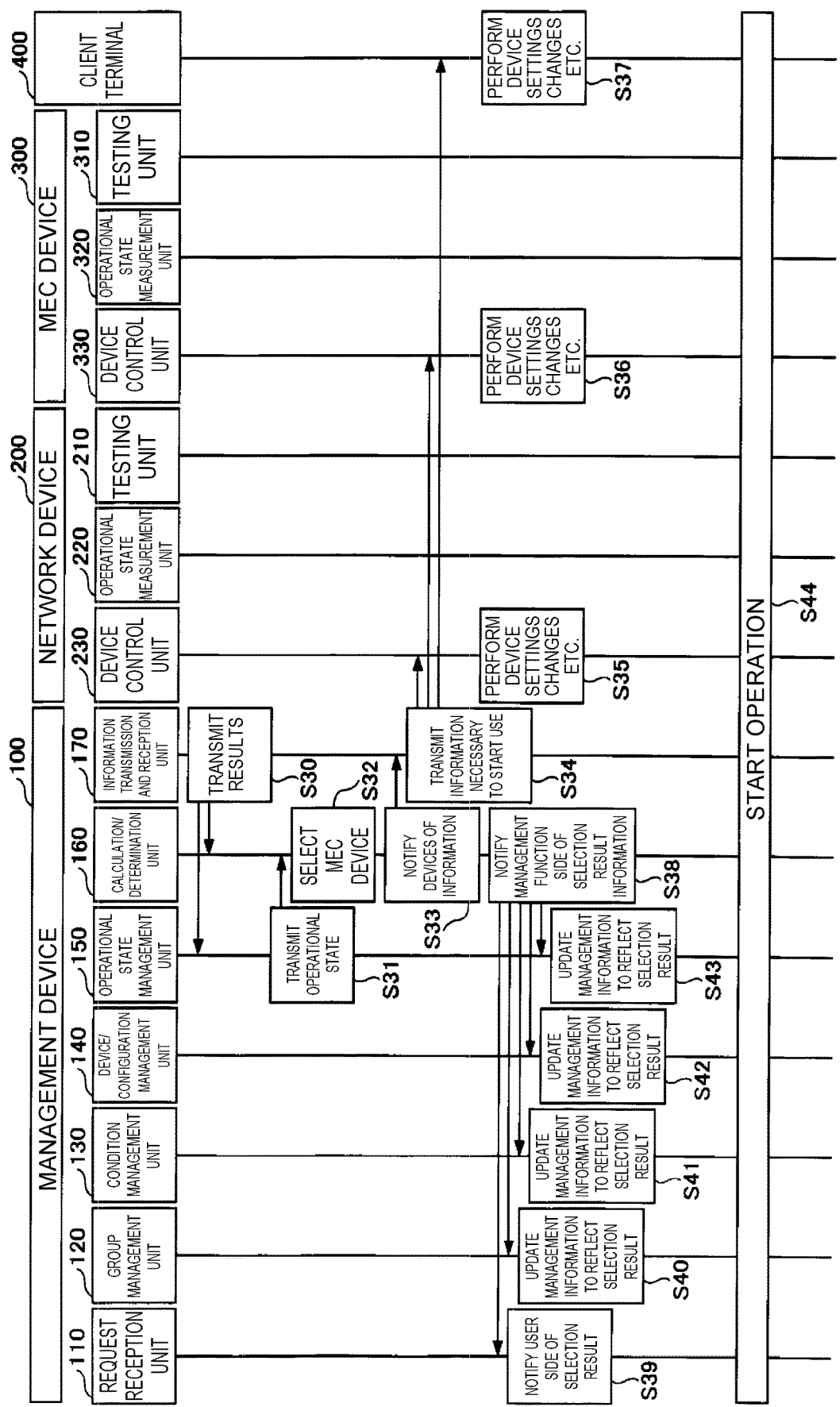

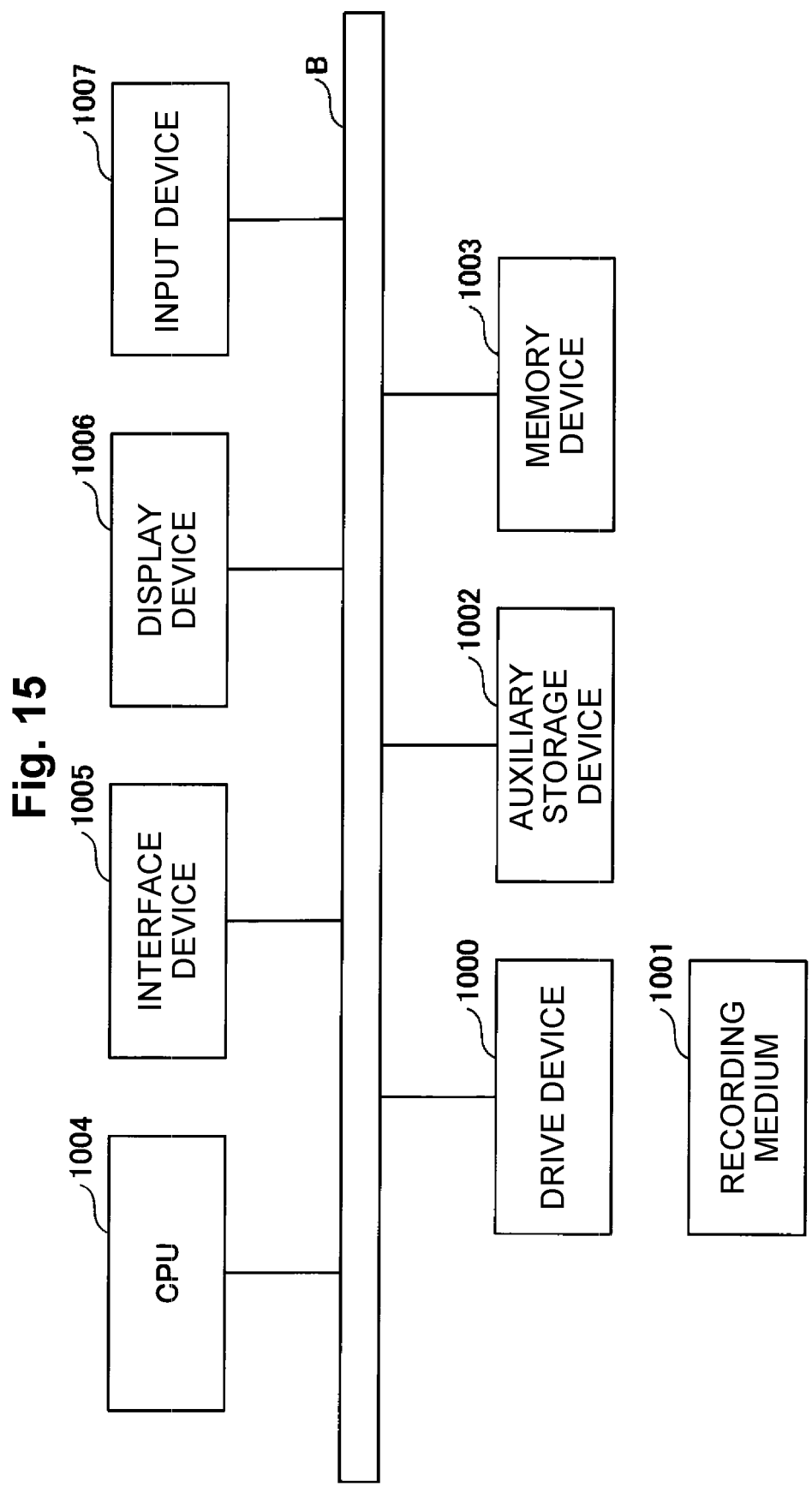

SYSTEM AND METHOD FOR SELECTING COMPUTING DEVICE FOR MULTI-USER ACCESS

CROSS-REFERENCE TO RELATED APPLICATIONS

This application is a National Stage application under 35 U.S.C. § 371 of International Application No. PCT/JP2020/008167, having an International Filing Date of Feb. 27, 2020. The disclosure of the prior application is considered part of the disclosure of this application, and is incorporated by reference in its entirety into this application.

TECHNICAL FIELD

The present invention relates to a technology for selecting an MEC device to be accessed by a plurality of client terminals.

BACKGROUND ART

At present, services utilizing low-latency communication are expected to be achieved. For example, work toward the launch of full-scale 5G commercial services is underway, and one use case thereof that is receiving attention is the utilization of the properties of ultra-reliable and low latency communications (URLLC). Examples of specific services utilizing low-latency communication include online games in which the quality of the user experience is greatly affected by communication latency, and self-driving automobiles.

Multi-access edge computing (MEC) is under consideration as a method for achieving low-latency communication. MEC is a method of achieving low-latency communication in which servers which traditionally have been deployed on the Internet are instead deployed on an MEC platform installed near the user on a telecommunications carrier network, thereby shortening the communication distance between client terminals and servers.

CITATION LIST

Patent Literature

Patent Literature 1: Japanese Patent Laid-Open No. 2019-41266

SUMMARY OF THE INVENTION

Technical Problem

In an environment (for example, an online game execution environment) where a single application is executed in conjunction with communication between a server and a plurality of client terminals, to achieve low-latency communication, it is conceivable to install the server providing the application on an MEC device in a single location on the network, and have the plurality of client terminals access the server on the MEC device.

To achieve the above configuration, it is necessary to select an MEC device in a single place from among the MEC devices installed in a plurality of places. At this time, because the amount of latency in each client terminal varies depending on the place where the MEC device is installed, it is necessary to select a place that achieves a balance of appropriate latency from among the plurality of candidate locations for the MEC device.

However, a technology that selects the installation location of an MEC device to be accessed by a plurality of client terminals with consideration for the amount of latency in the plurality of client terminals has not been proposed so far.

The present invention has been devised in the light of the above points, and an objective thereof is to provide a technology making it possible to select an MEC device to be accessed by a plurality of client terminals with consideration for the amount of latency in the plurality of client terminals.

Means for Solving the Problem

According to the disclosed technology, there is provided a management device that selects an MEC device to be accessed by a plurality of client terminals forming a group from among MEC devices disposed in a plurality of places, comprising:

an extracting means that extracts, from a database storing configuration information, the client terminals belonging to a specified group, network devices directly serving the client terminals, network devices between the serving network devices, and MEC devices to be treated as candidates for selection; and a selecting means that selects the MEC device to be accessed by the plurality of client terminals forming the group by using first and second amounts of latency, the first amount of latency being the amount of latency between each network device directly serving the client terminals belonging to the group and each MEC device, and the second amount of latency being the amount of latency between each network device directly serving the client terminals belonging to the group and each client terminal.

Effects of the Invention

According to the disclosed technology, there is provided a technology making it possible to select an MEC device to be accessed by a plurality of client terminals with consideration for the amount of latency in the plurality of client terminals.

BRIEF DESCRIPTION OF DRAWINGS

FIG. 7 is a diagram illustrating an example of a table storing amounts of latency between network devices and MEC device candidates.

FIG. 8 is a diagram illustrating an example of a table storing amounts of latency between network devices and client terminals.

FIG. 9 is a diagram illustrating the highest amount of latency for each network device.

FIG. 10 is a diagram illustrating an example of a table containing expected amounts of latency between client terminals and MEC device candidates.

FIG. 11 is a diagram illustrating the selection of the MEC device candidate having the lowest maximum latency.

FIG. 12 is a diagram illustrating an example of a table containing expected amounts of latency between client terminals and MEC device candidates.

FIG. 14 is a diagram illustrating an example of a processing sequence.

FIG. 15 is a diagram illustrating an example of the hardware configuration of a device.

DESCRIPTION OF EMBODIMENTS

Figure 1:
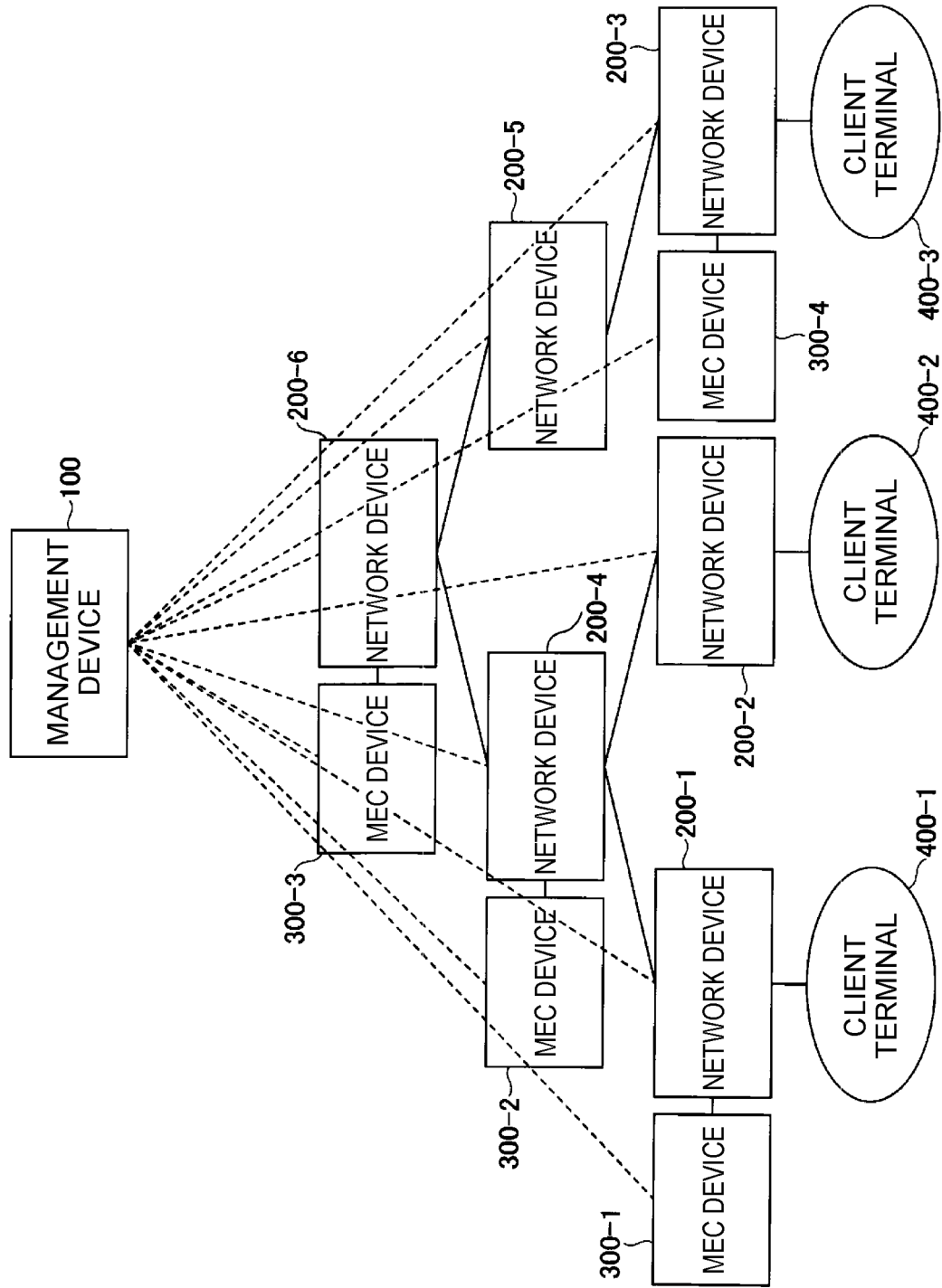
FIG. 1 is a diagram illustrating an example of the configuration of a system according to an embodiment of the present invention.

Hereinafter, an embodiment of the present invention (the present embodiment) will be described with reference to the drawings. The embodiment described hereinafter is merely one example, and embodiments to which the present invention may be applied are not limited to the embodiment hereinafter.

Overview of Embodiment

The present embodiment presupposes an environment where a single application is executed in conjunction with communication between a server and a plurality of client terminals. Low-latency communication is demanded when executing the application, and therefore the server is installed on an MEC device in a single location on a network, and all of the target client terminals access the server on the MEC device.

In addition, there are a plurality of places on the network where MEC devices are installed, and it is possible to select which MEC device to install the server on from among the plurality of candidate places. The distance between the MEC device and each client terminal varies depending on the selected MEC device, and consequently the amount of communication latency also varies.

The application anticipated by the present embodiment is affected not only by the simple magnitude of the latency for a lone client terminal, but also by factors such as the overall performance and the quality of the user experience according to the latency balance and the like among the plurality of existing client terminals. For this reason, a comprehensive determination of the installation location based on a plurality of amounts of latency for each respective client terminal is necessary. The following Examples 1 and 2 are examples of such a comprehensive determination.

Example 1

In an application of the type that proceeds while synchronizing information among all client terminals (such as an online game of the type that synchronizes information among all users, for example), the entire application progresses according to the progress of the client terminal with the highest amount of latency. For this reason, the performance and quality of experience when executing the application varies depending on the highest amount of latency from among the plurality of existing client terminals. Consequently, an MEC device is selected so as to be in an installation location where the maximum latency from among the plurality of existing client terminals is the lowest.

Example 2

In cases where it is necessary to ensure fairness, such as in a competitive online game, it is desirable to deploy the MEC device at a position where the latency is as balanced as possible among the client terminals. Consequently, an MEC device is selected so as to be in an installation location where the amount of latency is in a range that allows the online game to be played comfortably, and also where the variation in the amounts of latency among the client terminals is reduced.

Hereinafter, an example of a system configuration and device operation capable of a selection based on a comprehensive determination as above will be described in detail.

System Configuration

FIG. 1 is a diagram illustrating an example of the configuration of a system according to the embodiment of the present invention. As illustrated in FIG. 1, the system is provided with a management device 100, network devices 200-1 to 200-6, MEC devices 300-1 to 300-4, and client terminals 400-1 to 400-3, the devices being connected over a network as illustrated in the diagram. Note that the numbers of the devices in FIG. 1 are merely an example.

The management device 100 manages the arrangement and grouping of the client terminals 400, the network configuration, the arrangement of MEC devices, the operational state of each device, the selection conditions, and the like, and also executes a process of selecting the MEC device to be accessed by a plurality of client terminals 400 belonging to a group.

The network devices 200 connect with each other to form a network. The network devices 200 provide communication necessary to accommodate the client terminals 400 and the MEC devices 300 to execute an application. The network devices 200 are devices such as routers, switches, and mobile network base stations, for example.

The MEC devices 300 are connected to the network devices 200 and provide MEC services to the client terminals 400.

The client terminals 400 are terminals possessed by users who use the application and the like, and are devices such as PCs, smartphones, and tablets, for example. Note that the network devices, the MEC devices, and the client terminals may be collectively referred to as the "device(s)" in some cases.

Overview of Operations by Management Device 100

As described above, the management device 100 performs processes such as selecting an MEC device to be accessed by a plurality of the client terminals 400. Hereinafter, an overview of operations by the management device 100 will be described.

The management device 100 manages groups of client terminals 400 that operate in conjunction with an application, and performs processes such as measuring the amount of latency on the basis of the group and selecting the MEC device. The selection of an MEC device is the selection of an MEC device in a single place from among the MEC devices installed in a plurality of places.

The management device 100 also manages associated group information when managing the devices and network, and when measuring the amount of latency for a target group and selecting an MEC device, the management device 100 can identify and discard devices and networks that do not influence the target group, or reuse information about devices and networks that are shared with other groups. A more specific description follows below.

The management device 100 determines conditional settings to serve as the basis for selecting an MEC device 300 to use with the target group according to factors such as a user specification, the status of an application, and the operational states of devices and networks, and manages the conditional settings for each group.

The management device 100 calculates the amount of latency between each client terminal 400 belonging to the same group and each MEC device 300 on the network, and selects the MEC device 300 to be accessed by the client terminals 400 of the target group on the basis of the calculation results and the conditional settings for MEC selection. An example of the conditional settings and an example of the latency calculation logic will be described later.

The management device 100 manages the amount of latency between the MEC devices 300 and the network devices 200 shared by multiple groups separately from the amount of latency between the network devices 200 and the client terminals 400 with a limited range of use for each group, and combines the two types of latency to calculate an overall amount of latency. This arrangement makes it possible to limit the range of measurement and calculation according to information about the target group when calculating the amount of latency.

For example, when calculating a group A and a group B, the respective amounts of latency between the network devices 200 and the client terminals 400 are measured, but by measuring once and reusing the amount of latency between the MEC devices 300 and the network devices 200 shared by the two groups, the number of measurements can be reduced. For example, with regard to the amount of latency between the MEC devices 300 and the network devices 200, the amount of latency measured to select an MEC device for the group A can be reused when selecting an MEC device for the group B.

The management device 100 checks the operational state of devices and networks as well as the use status of the client terminals 400 even after determining the MEC device 300 to act as the deployment destination, and when a change of state occurs (such as an increase or decrease in number, a change of groups, a change of the destination network device 200, or a change in the communication conditions), the management device 100 recalculates the MEC deployment destination on the basis of the changed information, and redeploys if necessary.

Note that the measurement and recalculation necessary for redeployment can be limited to a range according to the target group. For example, in an environment being used by a group A and a group B, if there is a device or network change that affects only one of the groups, re-measurement and recalculation are performed only for the group to which the target client terminals 400 belong.

For example, in the case where there is a drop in throughput on the route between the MEC device 300-1 and the network device 200-3 which is used by only the group A of the groups A and B, it is sufficient to perform re-measurement and recalculation for the group A only.

As described above, by managing latency divided into the amount of latency between the MEC devices 300 and the network devices 200 and the amount of latency between the network devices 200 and the client terminals 400, information about the latency between the MEC devices 300 and the network devices 200 which does not change frequently can be reused, and only the information about the latency between the network devices 200 and the client terminals 400 which does change frequently can be partially updated to reselect an MEC device, thereby making it possible to reduce the number of times and range over which latency is measured and reselect an MEC device efficiently.

In the case where actual measurement of the amount of latency or the like is unavailable, an estimated value can be calculated on the basis of information such as the network configuration and route or the connection type, and an MEC device 300 can be selected on the basis of the estimated value. Also, in the case where the latency has been measured previously and no change in the operational state has occurred since, the previous measurement value can be used to select an MEC device 300.

Device Configuration

Next, an example of a functional configuration of the management device 100, the network devices 200, and the MEC devices 300 will be described. Note that the functional configuration described hereinafter is an example. Note that "to manage" means to perform actions such as storing information about a management target in a storage means, and adding, removing, updating, or reading out the information as necessary, for example.

Figure 2:
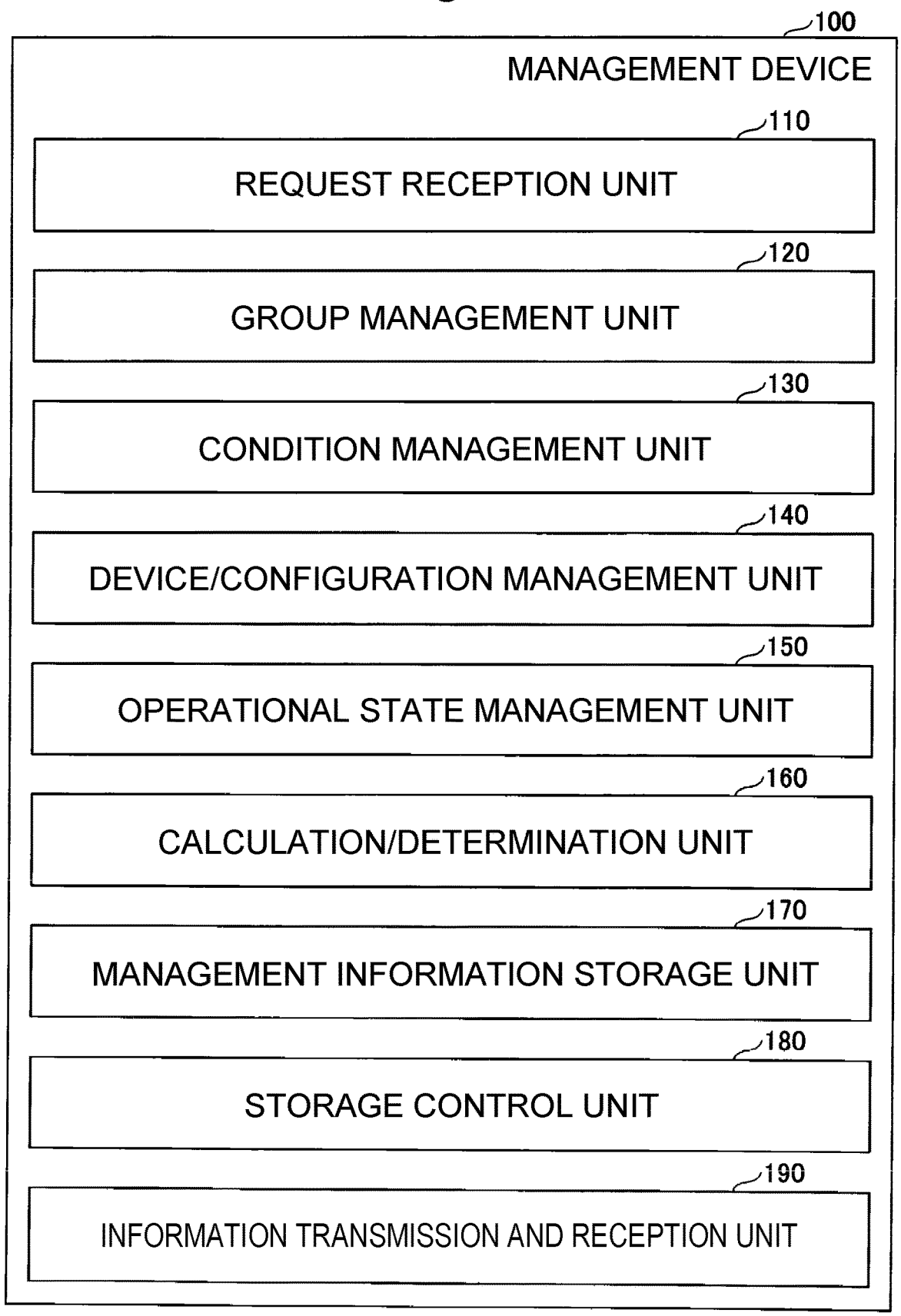
FIG. 2 is a functional configuration diagram of a management device.
Figure 9:
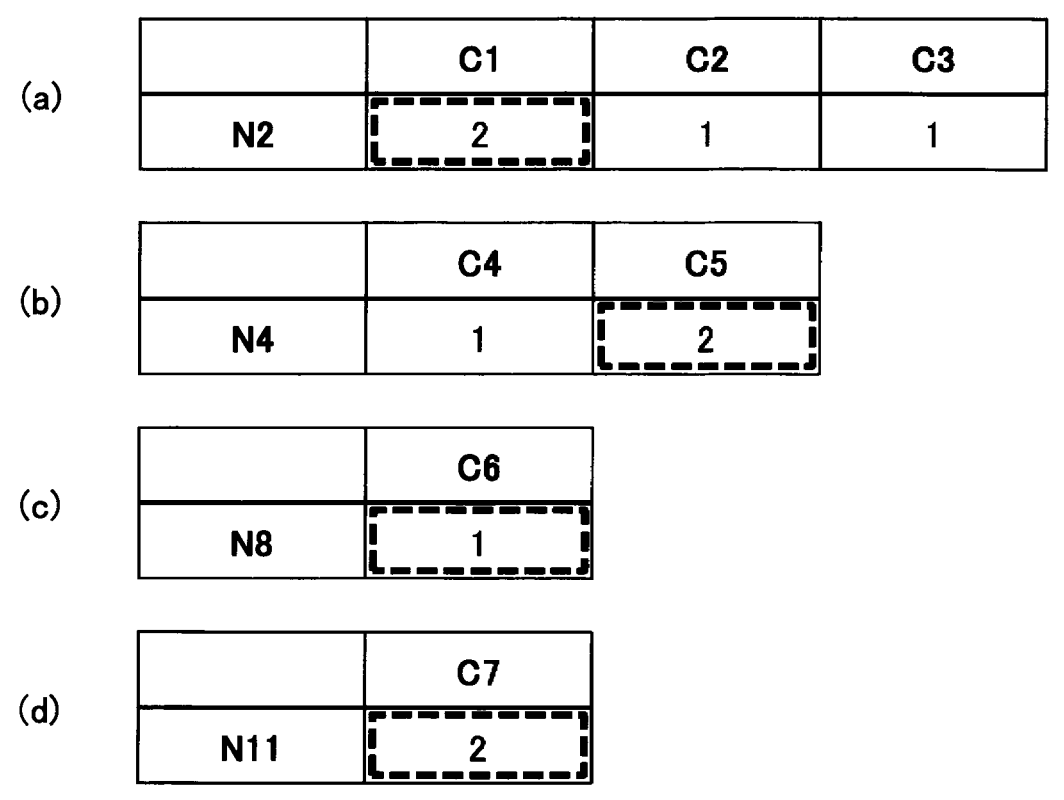

FIG. 2 is a diagram illustrating an example of the functional configuration of the management device 100. As illustrated in FIG. 9, the management device 100 includes a request reception unit 110, a group management unit 120, a condition management unit 130, a device/configuration management unit 140, an operational state management unit 150, a calculation/determination unit 160, a management information storage unit 170, a storage control unit 180, and an information transmission and reception unit 190.

The request reception unit 110 receives an instruction from a service provider, a user, or the like. The group management unit 120 manages information about the client terminals 400 and the groups to which the client terminals 400 belong. The condition management unit 130 determines and manages the conditional settings for selecting an MEC device. The device/configuration management unit 140 manages information about the arrangement of devices and device interconnections.

The operational state management unit 150 manages the operational state of each device and the network. The calculation/determination unit 160 performs necessary calculations on the basis of information such as the amount of latency, and selects an MEC device 300. The management information storage unit 170 stores management information related to group management, device/configuration management, and operational state management. The storage control unit 180 performs read and write operations or the like with respect to the management information storage unit 170. The information transmission and reception unit 190 transmits instructions to management target devices. The information transmission and reception unit 190 also receives the results of tests and measurements from management target devices.

Figure 3:
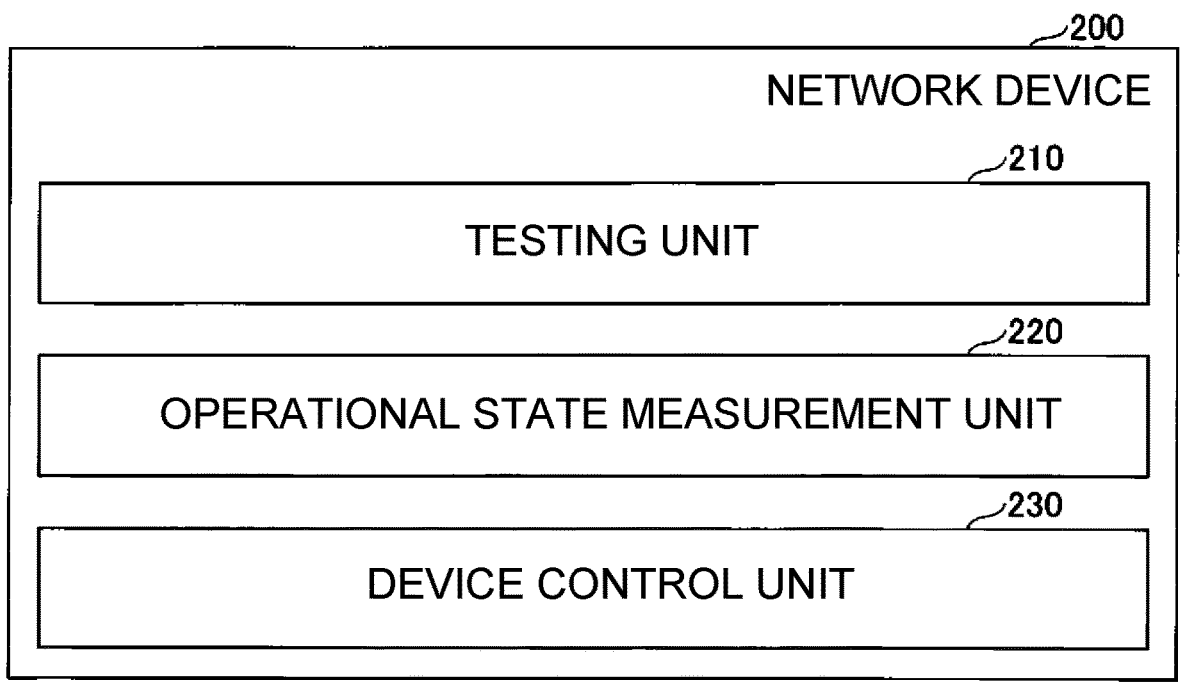
FIG. 3 is a functional configuration diagram of a network device.

FIG. 3 is a diagram illustrating an example of the functional configuration of one of the network devices 200. As illustrated in FIG. 3, the network device 200 is provided with a testing unit 210, an operational state measurement unit 220, and a device control unit 230.

The testing unit 210 performs testing on the MEC devices 300 or the client terminals 400 thereunder. The "testing" includes measurement of the amount of latency. The operational state measurement unit 220 measures the operational state of the network device 200. The operational state refers to properties such as the load conditions (such as CPU utilization), traffic throughput, and presence or absence of errors, for example.

The device control unit 230 receives a request from the management device 100 and performs actions such as necessary testing and measurement or making settings changes.

Figure 4:
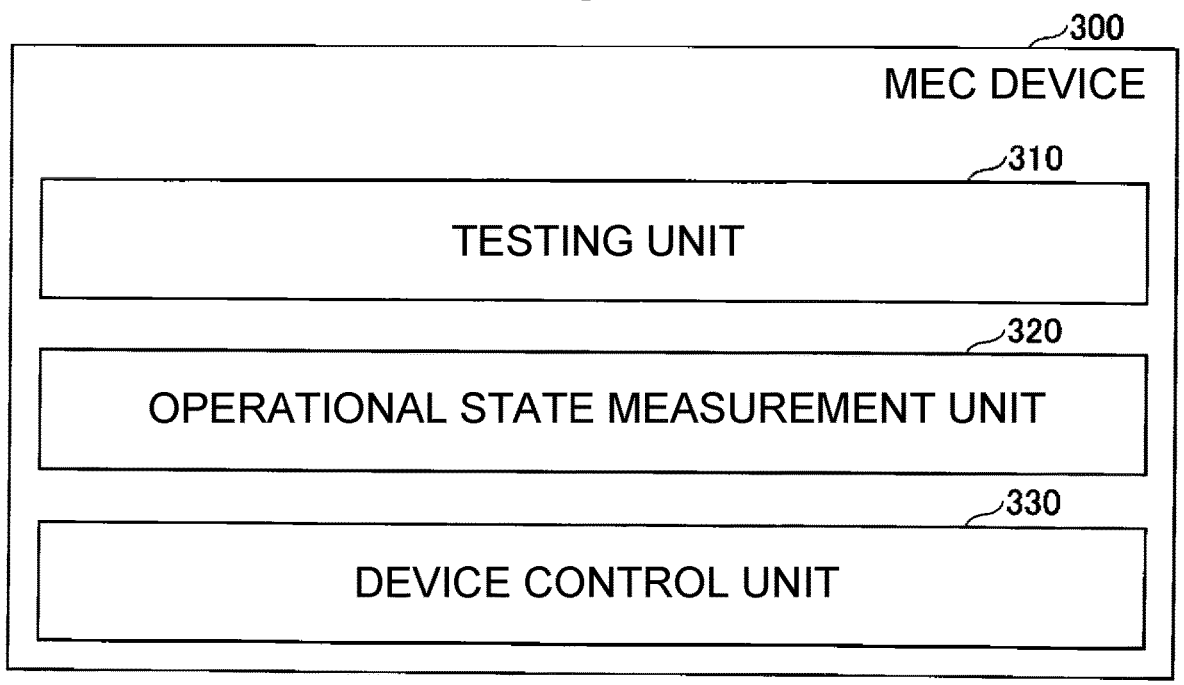
FIG. 4 is a functional configuration diagram of an MEC device.

FIG. 4 is a diagram illustrating an example of the functional configuration of one of the MEC devices 300. As illustrated in FIG. 4, the MEC device 300 is provided with a testing unit 310, an operational state measurement unit 320, and a device control unit 330.

The testing unit 310 performs testing on the network devices 200. The "testing" includes measurement of the amount of latency. The operational state measurement unit 320 measures the operational state of the MEC device 300. The operational state refers to properties such as the load conditions (such as CPU utilization), traffic throughput, and presence or absence of errors, for example. The device control unit 330 receives a request from the management device 100 and performs actions such as necessary testing and measurement or making settings changes.

Example of MEC Device Selection Process

Next, an example of the process for selecting an MEC device 300 executed by the calculation/determination unit 160 in the management device 100 will be described in detail.

The following example presupposes the case of using an application of the type that proceeds while synchronizing information among all of the client terminals 400 belonging to a target group. Consequently, the condition determined as the condition for selecting an MEC device 300 is a condition for selecting the MEC device 300 in a location where the maximum latency with the MEC device 300 from among the plurality of existing client terminals 400 is the lowest.

For example, the user inputs information about the above condition into the request reception unit 110. The information about the condition from the request reception unit 110 is stored in the condition management unit 130 and also included in a notification to the calculation/determination unit 160.

Figure 5:
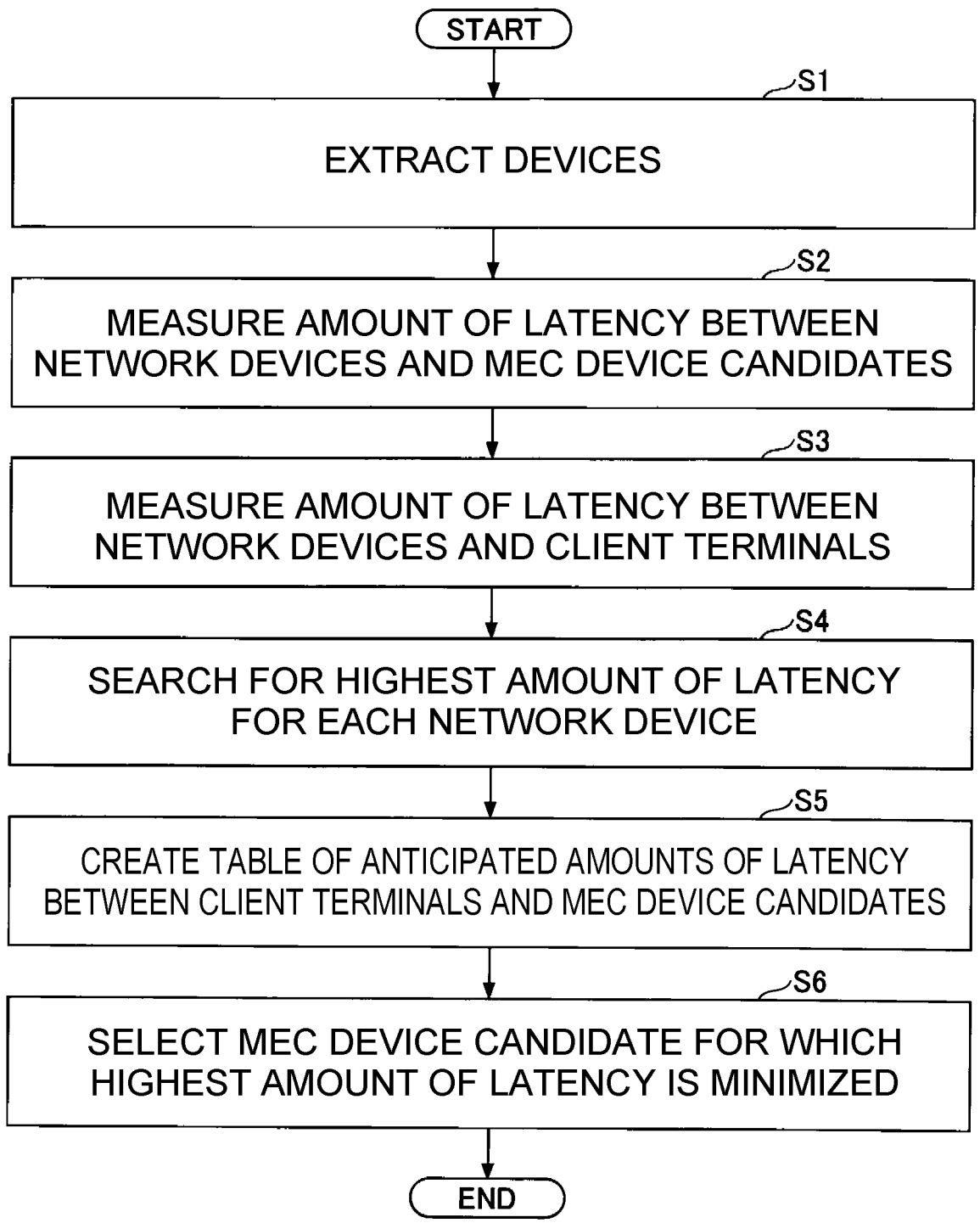
FIG. 5 is a flowchart illustrating an example of a process of selecting an MEC device.

Hereinafter, a processing sequence by the calculation/determination unit 160 under the above condition will be described while illustrating a specific example by following the sequence of the flowchart in FIG. 5. Here, it is assumed that the device/configuration information necessary for the following process is already stored in the device/configuration management unit 140, and the calculation/determination unit 160 can acquire the device/configuration information corresponding to the target group from the device/configuration management unit 140. Note that the device/configuration management unit 140 may also be referred to as a "database storing configuration information".

S1 (Step 1)

On the basis of information about a specified group targeted for calculation, the calculation/determination unit 160 of the management device 100 extracts the one or more client terminals 400 belonging to the group from the device/configuration management unit 140. Additionally, the calculation/determination unit 160 extracts the network devices 200 directly serving the client terminals 400 and the connecting network devices 200 in between the above network devices 200 from the device/configuration management unit 140. Additionally, the calculation/determination unit 160 extracts candidates of MEC devices 300 usable by the client terminals 400 in the target group from the device/configuration management unit 140. Note that the extraction function of the calculation/determination unit 160 may also be referred to as an extracting means. Moreover, the selection function described below of the calculation/determination unit 160 may also be referred to as a selecting means.

Figure 6:
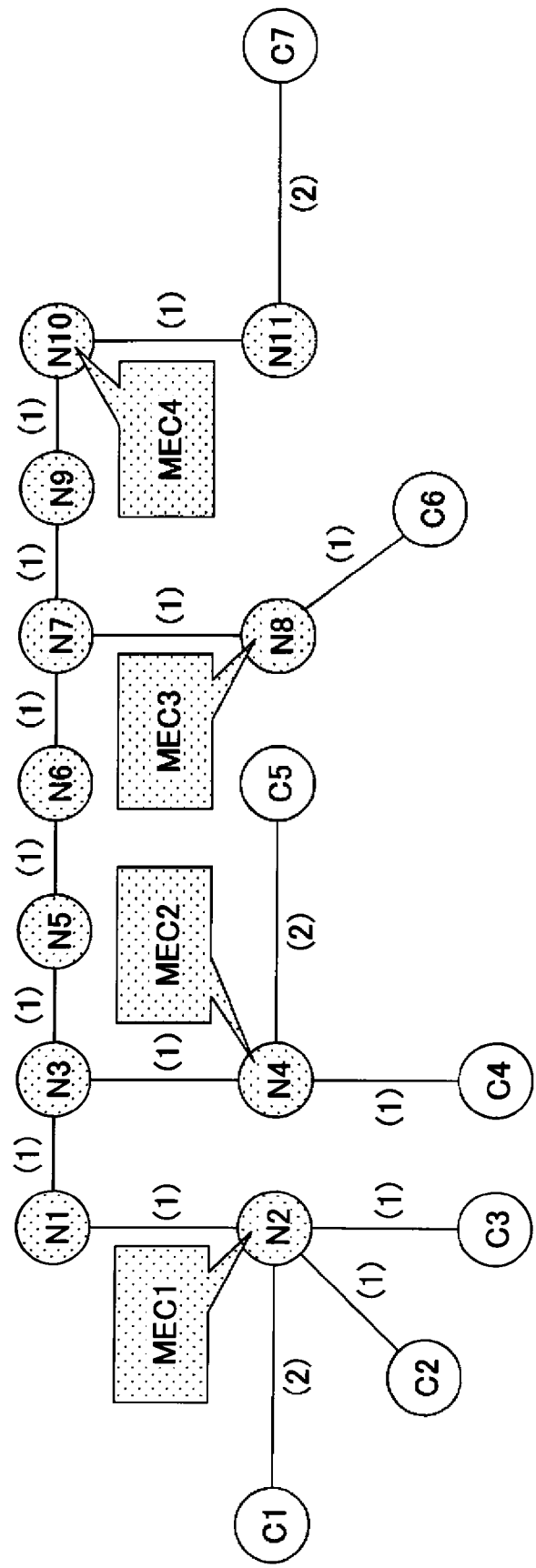
FIG. 6 is a diagram illustrating an example of extracted devices.

FIG. 6 illustrates an example of the extracted devices. In FIG. 6, C1 to C7 are the extracted client terminals 400, N1 to N11 are the extracted network devices 200, and MEC1 to MEC4 are the extracted MEC device 300 candidates. In FIG. 3, the numerical values in parentheses next the lines indicate the amount of latency on each segment.

In FIG. 6, N2, N4, N8, and N11 are the respective network devices 200 directly serving the client terminals 400. On the other hand, N1, N3, N5, N6, N7, N9, and N10 are the connecting network devices 200 in between the above network devices 200. The candidates of MEC devices 300 usable by the client terminals 400 in the target group are the MEC devices 300 directly connected to the network devices 200 directly serving the client terminals 400 and the MEC devices 300 directly connected to the network devices 200 connected within a predetermined number of hops from the network devices 200 directly serving the client terminals 400. The "predetermined number of hops" is 1, for example.

S2

The calculation/determination unit 160 measures the respective amounts of latency between each network device 200 directly serving the client terminals 400 extracted in S1 and each MEC device 300 candidate where a server can be installed, and stores the results in a table. The table may be retained by the calculation/determination unit 160 or by the operational state management unit 150.

Specifically, the measurement performed by the calculation/determination unit 160 involves transmitting a measurement request to the target devices and receiving a measurement result from the target devices. Note that in the case where the needed amounts of latency are already being stored in a table and are usable, the stored amounts of latency may also be used without performing measurement.

In the example illustrated in FIG. 6, the amount of latency is measured between each of N2, N4, N8, and N11 and each of MEC1 to MEC4, and the results illustrated in FIG. 7 are obtained. In FIG. 7, the amount of latency between MEC1 and N4 is 3, for example.

S3

The calculation/determination unit 160 measures the respective amounts of latency between each network device 200 directly serving the client terminals 400 and the client terminals 400, and stores the results in a table.

Figure 8:
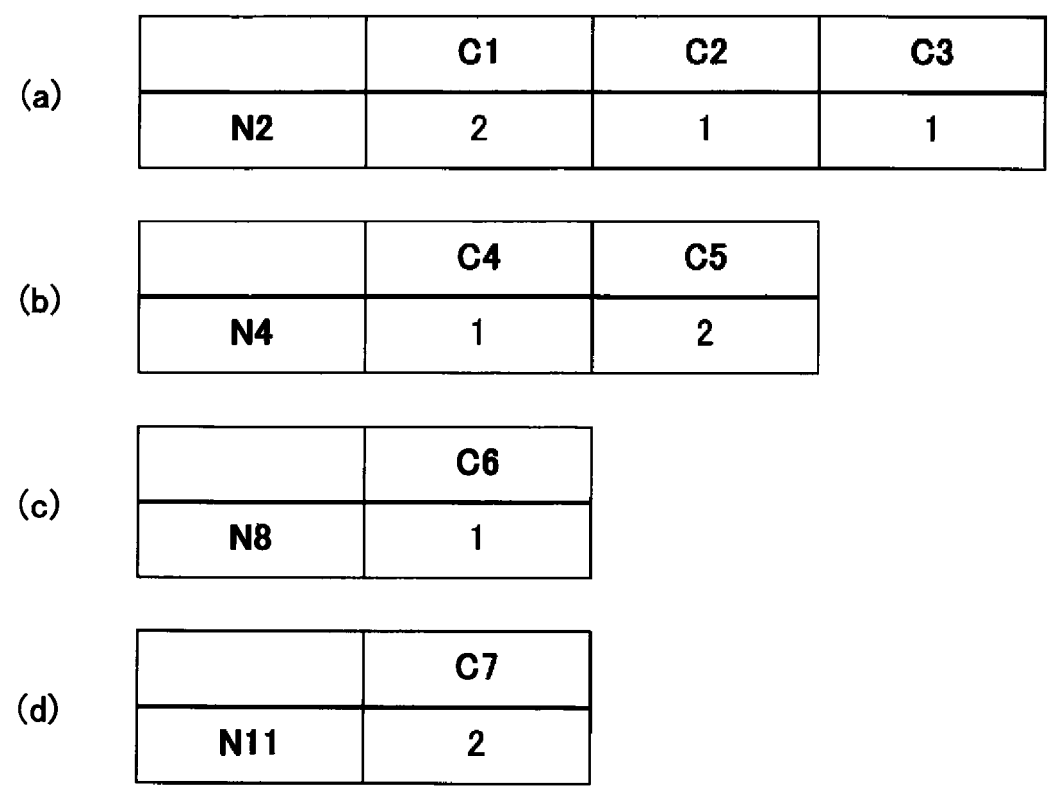

In the example of FIG. 6, the amounts of latency between N2 and C1 to C3, the amounts of latency between N4 and C4 and C5, the amount of latency between N8 and C6, and the amount of latency between N11 and C7 are measured, and the results illustrated in FIG. 8 are obtained.

S4

The calculation/determination unit 160 searches for the highest amount of latency for each network device 200 from the table of the amounts of latency between the client terminals 400 and the serving network devices 200 obtained in S3.

For example, in the case of the latency table illustrated in FIG. 8 obtained on the basis of the configuration in FIG. 6, the highest amount of latency among the amounts of latency between N2 and C1 to C3 exists between N2 and C1, and therefore the amount of latency between N2 and C1 is obtained as a search result, as illustrated in FIG. 9.

S5

The calculation/determination unit 160 combines the highest amounts of latency between the client terminals 400 and the network devices 200 obtained in S4 with the latency table between each network device 200 and each MEC device 300 candidate measured in S2, and creates a table of the anticipated amounts of latency between the client terminals 400 and the MEC device 300 candidates.

For example, in the case of the latency tables illustrated in FIGS. 7 and 9 obtained on the basis of the configuration in FIG. 6, the amount of latency between C1 connected to N2 and MEC1 is 0+2=2. As another example, the amount of latency between C7 connected to N11 and MEC1 is 8+2=10. Through similar calculations, the results illustrated in FIG. 10 are obtained.

S6

On the basis of the table created in S5, the calculation/determination unit 160 searches for the highest amount of latency between the client terminals 400 and the MEC device 300 candidates with respect to each MEC device 300 candidate. The MEC device candidate having the lowest maximum latency is chosen and selected as the installation location of the server.

For example, in the case where the table illustrated in FIG. 10 is obtained in S5, the highest amount of latency for MEC1 is the latency of 10 with C7, the highest amount of latency for MEC2 is the latency of 9 with C7, the highest amount of latency for MEC3 is the latency of 8 with C1, and the highest amount of latency for MEC4 is the latency of 9 with C1, as illustrated in FIG. 11(a). Consequently, as illustrated in FIG. 11(b), MEC3 having the lowest maximum latency is selected as the installation location of the server.

The example described above is an example of selecting the MEC device such that the maximum latency from among the plurality of existing client terminals 400 is the lowest.

In the configuration illustrated in FIG. 6, in the case of selecting an MEC device 300 so that the amount of latency is in a range that allows the online game to be played comfortably and also so that the variation in the amounts of latency among the client terminals 400 is reduced, for example, the calculation/determination unit 160 first creates the table in FIG. 7 (the amounts of latency between the MEC devices and the network devices) and the table in FIG. 8 (the amounts of latency between the client terminals and the serving network devices) similarly to the above example.

Next, the calculation/determination unit 160 uses the table in FIG. 7 and the table in FIG. 8 to calculate the amount of latency between each of MEC1 to MEC4 and each of C1 to C7. With this arrangement, the table illustrated in FIG. 12 is created in which columns for C2, C3, and C4 have been added to the table illustrated in FIG. 10.

Additionally, the calculation/determination unit 160 selects, from among MEC1 to MEC4, the MEC device having the least variance in the amounts of latency with the client terminals from among the one or more MEC devices having a maximum latency with the client terminals that is a predetermined threshold or lower. Note that in this case, the variance is used as an example of an indicator of variation.

In the example illustrated in FIG. 12, if the predetermined threshold is set to 9, the candidates are narrowed down to MEC2, MEC3, and MEC4. From among MEC2, MEC3, and MEC4, the variance in the amounts of latency with the client terminals is the least for MEC4, and therefore MEC4 is selected.

By performing a process as described above, a position where communication can be performed with respectively appropriate amounts of latency between the plurality of client terminals 400 and the server can be selected, and the placement of the MEC device 300 can be determined. With this arrangement, the performance of a service using the MEC device 300 can be maximized.

Also, by limiting the range over which to perform measurement and calculation on the basis of information about the target group, necessary selections can be made efficiently.

Processing Sequence

Figure 13:
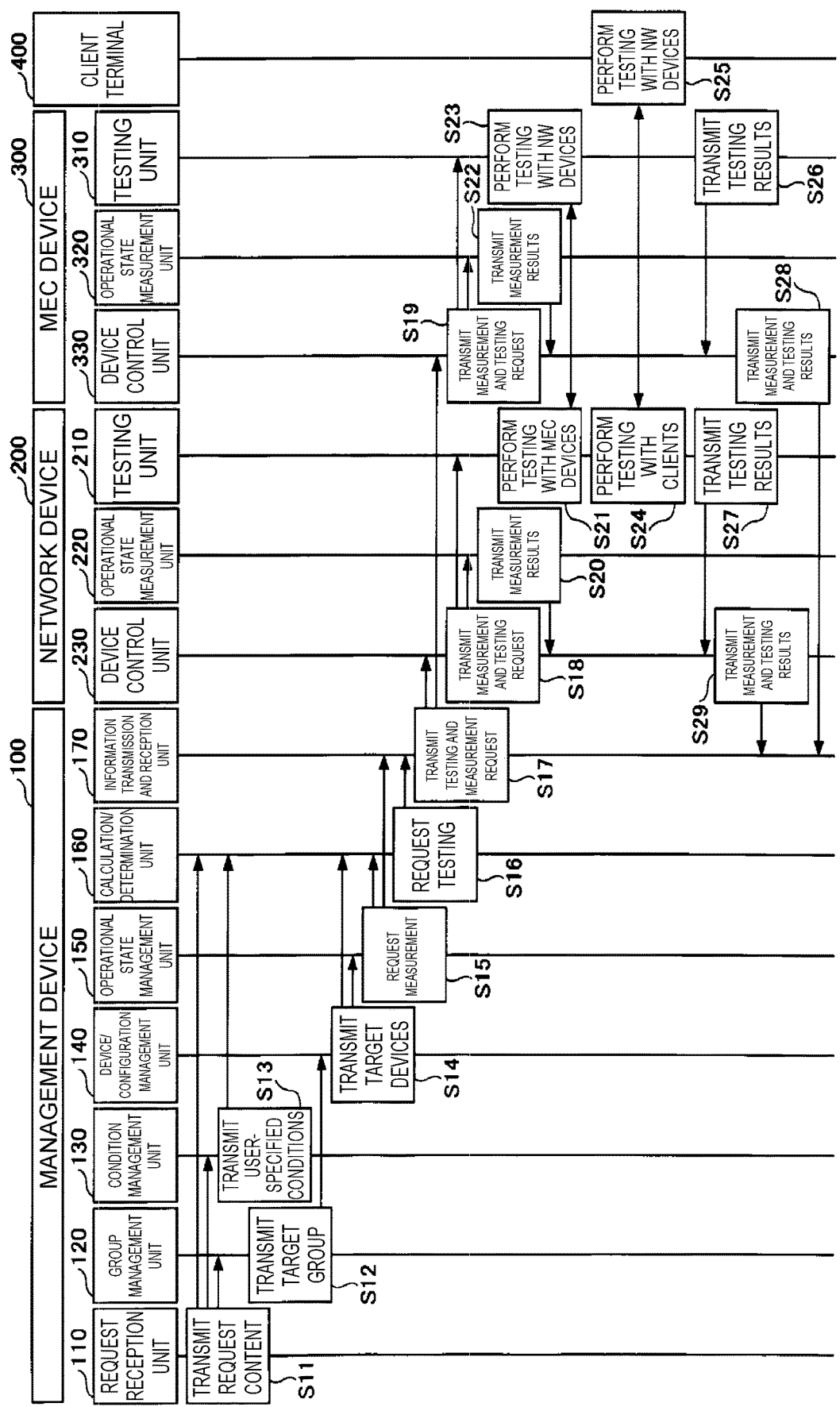
FIG. 13 is a diagram illustrating an example of a processing sequence.

Next, FIGS. 13 and 14 will be referenced to describe an example of the sequence of a process according to the present embodiment. Note that the management information storage unit 170 and the storage control unit 180 of the management device 100 provide information to each functional unit as necessary.

In S11, the request reception unit 110 receives a request from the user or the like and transmits a notification including the request content to the calculation/determination unit 160, the condition management unit 130, and the group management unit 120.

In S12, the group management unit 120 manages a target group specified by the request, and also notifies the device/configuration management unit 140 of the target group. In S13, the condition management unit 130 notifies the calculation/determination unit 160 of user-specified conditions.

In S14, the device/configuration management unit 140 notifies the operational state management unit 150 and the calculation/determination unit 160 of the target devices and configuration.

In S15, the operational state management unit 150 determines whether or not the operational state should be measured, and requests the calculation/determination unit 160 and the management information storage unit 170 to perform measurement if necessary. In S16, the calculation/determination unit 160 requests the information transmission and reception unit 190 to perform testing (measurement) between the target devices and the client terminals, and in S17, the information transmission and reception unit 190 transmits a notification including a request for testing and measurement to the device control unit 230 of the network devices 200 and the device control unit 330 of the MEC devices 300.

In S18, the device control unit 230 transmits a notification including a request for measurement and testing to the operational state measurement unit 220 and the testing unit 210. In S20, the operational state measurement unit 220 measures the state and notifies the device control unit 230 of the result.

In S19, the device control unit 330 transmits a notification including a request for measurement and testing to the operational state measurement unit 320 and the testing unit 310. In S22, the operational state measurement unit 320 measures the state and notifies the device control unit 330 of the result.

In S21, the testing unit 210 performs testing with the MEC devices 300, and in S23, the testing unit 310 performs testing with the network devices 200.

In S24, the testing unit 210 performs testing with the client terminals 400, and in S25, the client terminals 400 perform testing with the network devices 200. In S26, S27, S28, and S29, the results of test and measurement are included in a notification to the source of the request.

In S30 of FIG. 14, the information transmission and reception unit 190 notifies the operational state management unit 150 and the calculation/determination unit 160 of the results of measurement and testing. In S31, the operational state management unit 150 notifies the calculation/determination unit 160 of the operational state.

In S32, the calculation/determination unit 160 uses the collected information to select an MEC device. In S33 and S34, information necessary to use the selected device is included in a notification to each target device. In S35, S36, and S37, device setting changes and the like are performed in each device.

In S38, the calculation/determination unit 160 notifies each functional unit of information about the selection result. In S39 to S43, the selection result is reflected in the management information in each functional unit. In S44, operation is started.

Hardware Configuration Example

The management device 100, the network devices 200, the MEC devices 300, and the client terminals 400 can all be achieved by causing a computer to execute a program, for example. The computer may be a physical computer or a virtual machine. The "computer" includes equipment such as a router or a switch having a configuration that includes components such as a CPU and a memory.

In other words, the devices (management device 100, network devices 200, MEC devices 300, client terminals 400) may be achieved by using hardware resources such as a CPU and a memory built into the computer to execute a computer corresponding to the processes performed by the devices. The above program may also be saved and distributed by being recorded onto a computer-readable recording medium (such as a portable memory). Moreover, the above program may also be provided over a network such as the Internet or through email.

FIG. 15 is a diagram illustrating an example of a hardware configuration of the above computer. The computer in FIG. 15 includes components such as a drive device 1000, an auxiliary storage device 1002, a memory device 1003, a CPU 1004, an interface device 1005, a display device 1006, and an input device 1007, which are interconnected by a bus B.

A program that achieves processing on the computer is provided by a recording medium 1001 such as a CD-ROM or a memory card, for example. When the recording medium 1001 storing the program is placed in the drive device 1000, the program is installed from the recording medium 1001 to the auxiliary storage device 1002 through the drive device 1000. However, the program does not necessarily have to be installed from the recording medium 1001, and may also be downloaded from another computer over a network. The auxiliary storage device 1002 stores the installed program, and also stores information such as necessary files and data.

When an instruction to launch the program is given, the memory device 1003 reads out and stores the program from the auxiliary storage device 1002. The CPU 1004 executes functions related to the devices by following the program stored in the memory device 1003. The interface device 1005 is used as an interface for connecting to a network, and functions as an inputting means and an outputting means with respect to the network. The display device 1006 displays information such as a graphical user interface (GUI) according to the program. The input device 157 includes a device such as a keyboard and mouse, buttons, or a touch panel, and is used to input various operating instructions.

Summary of Embodiment

This specification discloses at least a management device, a selection method, and a program according to each of the following items.

First Item

A management device that selects an MEC device to be accessed by a plurality of client terminals forming a group from among MEC devices disposed in a plurality of places, comprising:

an extracting means that extracts, from a database storing configuration information, the client terminals belonging to a specified group, network devices directly serving the client terminals, network devices between the serving network devices, and MEC devices to be treated as candidates for selection; and a selecting means that selects the MEC device to be accessed by the plurality of client terminals forming the group by using first and second amounts of latency, the first amount of latency being the amount of latency between each network device directly serving the client terminals belonging to the group and each MEC device, and the second amount of latency being the amount of latency between each network device directly serving the client terminals belonging to the group and each client terminal.

Second Item

The management device according to the first item, wherein the selecting means calculates amounts of latency between the client terminals and the MEC devices on a basis of the first and second amounts of latency, and selects the MEC device having the lowest maximum latency from among the amounts of latency with the plurality of client terminals belonging to the group.

Third Item

The management device according to the first item, wherein the selecting means calculates amounts of latency between the client terminals and the MEC devices on a basis of the first and second amounts of latency, and selects the MEC device having the least variation in the amounts of latency with the client terminals within a predetermined latency range.

Fourth Item

A selection method executed by a management device that selects an MEC device to be accessed by a plurality of client terminals forming a group from among MEC devices disposed in a plurality of places, comprising:

extracting, from a database storing configuration information, the client terminals belonging to a specified group, network devices directly serving the client terminals, network devices between the serving network devices, and MEC devices to be treated as candidates for selection; and selecting the MEC device to be accessed by the plurality of client terminals forming the group by using first and second amounts of latency, the first amount of latency being the amount of latency between each network device directly serving the client terminals belonging to the group and each MEC device, and the second amount of latency being the amount of latency between each network device directly serving the client terminals belonging to the group and each client terminal.

Fifth Item

A program causing a computer to function as each means of the management device according to any one of the first to third items.

Although the present embodiment has been described, the present invention is not limited to such a specific embodiment, and various alterations and modifications are possible within the scope of the gist of the present invention as stated in the claims.

REFERENCE SIGNS LIST 100 management device
110 request reception unit
120 group management unit
130 condition management unit
140 device/configuration management unit
150 operational state management unit
160 calculation/determination unit
170 management information storage unit
180 storage control unit
190 information transmission and reception unit
200 network device
210 testing unit
220 operational state measurement unit
230 device control unit
300 MEC device
310 testing unit
320 operational state measurement unit
330 device control unit
1000 drive device
1001 recording medium
1002 auxiliary storage device
1003 memory device
1004 CPU
1005 interface device
1006 display device
1007 input device

The invention claimed is:

1. A management device for selecting a multi-access edge computing (MEC) device to be accessed by client terminals forming a group, the management device comprising:
   a memory device storing computer-executable instructions and one or more processors configured to execute the computer-executable instructions to:
   determine, from a database storing configuration information, a a set of client terminals belonging to a specified group, iii) a first set of network devices that each directly serves one or more of the set of client terminals, (iii) a second set of network devices that each connects to one or more of the first set of network devices, and (iv) a set of MEC devices as candidates for selection;
   for each network device in the first set of network devices, measure a respective first latency between the network device and each MEC device in the set of MEC devices, and store the measured first latencies in a first table;
   for each network device in the first set of network devices, measure a respective second latency between the network device and each client terminal in the set of client terminals that the network device is directly serving, and store the measured second latencies in a second table;
   for each MEC device in the set of MEC devices and for each network device in the first set of network devices, compute a combined latency between the MEC device and at least one client terminal that the network device is directly serving by combining data from the first table and data from the second table, and store the computed combined latencies in a third table; and
   select an MEC device to be accessed by the set of client terminals from the set of MEC devices by using the combined latencies in the third table.

2. The management device according to claim 1, wherein the one or more processors are further configured to:
   for each MEC device in the set of MEC devices, determine, from data in the third table, a maximum combined latency in the combined latencies between the MEC device and the set of client terminals, and select the MEC device having the lowest maximum combined latency with the set of client terminals.

3. The management device according to claim 1, wherein the one or more processors are further configured to:
   for each MEC device in the set of MEC devices, determine, from data in the third table, a variance in the combined latencies between the MEC device and the set of client terminals, and select the MEC device having the least variance in the combined latencies with the set of client terminals within a predetermined latency range.

4. A selection method executed by a management device for selecting an MEC device to be accessed by client terminals forming a group, the selection method comprising:
   determining, from a database storing configuration information, (i) a set of client terminals belonging to a specified group, (ii) a first set of network devices that each directly serves one or more of the set of client terminals, (iii) a second set of network devices that each connects to one or more of the first set of network devices, and (iv) a set of MEC devices as candidates for selection;
   for each network device in the first set of network devices, measuring a respective first latency between the network device and each MEC device in the set of MEC devices, and storing the measured first latencies in a first table;
   for each network device in the first set of network devices, measuring a respective second latency between the network device and each client terminal in the set of client terminals that the network device is directly serving, and storing the measured second latencies in a second table;
   for each MEC device in the set of MEC devices and for each network device in the first set of network devices, computing a combined latency between the MEC device and at least one client terminal that the network device is directly serving by combining data from the first table and data from the second table, and storing the computed combined latencies in a third table; and selecting an MEC device to be accessed by the set of client terminals from the set of MEC devices by using the combined latencies in the third table.

5. A non-transitory computer-readable medium storing a program causing a computer to perform operations of a selection method for selecting an MEC device to be accessed by client terminals forming a group, the operations comprising:

determining, from a database storing configuration information, (i) a set of client terminals belonging to a specified group, (ii) a first set of network devices that each directly serves one or more of the set of client terminals, (iii) a second set of network devices that each connects to one or more of the first set of network devices, and (iv) a set of MEC devices as candidates for selection;

for each network device in the first set of network devices, measuring a respective first latency between the network device and each MEC device in the set of MEC devices, and storing the measured first latencies in a first table;

for each network device in the first set of network devices, measuring a respective second latency between the network device and each client terminal in the set of client terminals that the network device is directly serving, and storing the measured second latencies in a second table;

for each MEC device in the set of MEC devices and for each network device in the first set of network devices, computing a combined latency between the MEC device and at least one client terminal that the network device is directly serving by combining data from the first table and data from the second table, and storing the computed combined latencies in a third table; and selecting an MEC device to be accessed by the set of client terminals from the set of MEC devices by using the combined latencies in the third table.

6. The selection method according to claim 4, further comprising:

for each MEC device in the set of MEC devices, determining, from data in the third table, a maximum combined latency in the combined latencies between the MEC device and the set of client terminals, and selecting the MEC device having the lowest maximum combined latency with the set of client terminals.

7. The selection method according to claim 4, further comprising:

for each MEC device in the set of MEC devices, determining, from data in the third table, a variance in the combined latencies between the MEC device and the set of client terminals, and selecting the MEC device having the least variance in the combined latencies with the set of client terminals within a predetermined latency range.

8. The non-transitory computer-readable medium according to claim 5, wherein the operations further comprise:

for each MEC device in the set of MEC devices, determining, from data in the third table, a maximum combined latency in the combined latencies between the MEC device and the set of client terminals, and selecting the MEC device having the lowest maximum combined latency with the set of client terminals.

9. The non-transitory computer-readable medium according to claim 5, wherein the operations further comprise:

for each MEC device in the set of MEC devices, determining, from data in the third table, a variance in the combined latencies between the MEC device and the set of client terminals, and selecting the MEC device having the least variance in the combined latencies with the set of client terminals within a predetermined latency range.

* * * * *